(12) United States Patent
Nishio

(10) Patent No.: US 7,148,987 B2
(45) Date of Patent: Dec. 12, 2006

(54) INFORMATION PROCESSING APPARATUS, INFORMATION PROCESSING METHOD, AND PROGRAM FOR CONTROLLING COMPUTER

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/300,525

(22) Filed: Nov. 21, 2002

(65) Prior Publication Data

US 2003/0103226 A1 Jun. 5, 2003

(30) Foreign Application Priority Data

Dec. 4, 2001 (JP) .............................. 2001-370567

(51) Int. Cl.
*G06F 15/00* (2006.01)
*G06F 15/173* (2006.01)
*H04N 1/00* (2006.01)

(52) U.S. Cl. ..................... 358/1.15; 358/434; 358/435; 358/403; 709/218; 709/224; 709/226

(58) Field of Classification Search ............... 358/1.15, 358/434, 435, 403, 438, 439; 709/218, 224, 709/226

See application file for complete search history.

(56) References Cited

U.S. PATENT DOCUMENTS

| 6,038,034 | A | 3/2000 | Nishio et al. ............... 358/404 |
| 6,348,971 | B1 * | 2/2002 | Owa et al. .................. 358/1.15 |
| 6,631,008 | B1 * | 10/2003 | Aoki ......................... 358/1.15 |
| 6,804,022 | B1 * | 10/2004 | Fujiwara et al. ........... 358/1.15 |
| 6,965,931 | B1 * | 11/2005 | Helms ........................ 709/223 |
| 2001/0044822 | A1 | 11/2001 | Nishio ........................ 709/202 |

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

The present invention eliminates a need to install, on a computer, special driver software for controlling a network-enabled device to be used as well as a need to set network information on the driver software.

15 Claims, 5 Drawing Sheets

FIG. 4

```
M-SEARCH * HTTP/1.1
HOST : 239.255.255.250 : 1900
MAN : "ssdp : discover"
MX : 60
ST : urn : schemas-upnp-org : service : Print : 1.0
```

FIG. 5

```
HTTP/1.1 200 OK
CACHE-CONTROL : max-age = seconds until advertisement expires
DATE : when response was generated
EXT :
LOCATION : URL for Server
SERVER : OS/version UPnP/1.0 product/version
ST : urn : schemas-upnp-org : service : Print : 1.0
USN : advertisement UUID
```

FIG. 6

```
POST path of control URL HTTP/1.1
HOST : host of control URL : port of control URL
CONTENT-LENGTH : bytes in body
CONTENT-TYPE : text/xml ; charset="utf-8"
SOAPACTION : "urn:schemas-upnp-org:service:Print:1.0#SelectedPrinter"
<s:Envelope
    xmlns:s="http://schemas.xmlsoap.org/soap/envelope/"
    s:encodingStyle="http://schemas.xmlsoap.org/soap/encoding/">
  <s:Body>
    <u:SelectedPrinter xmlns:u="urn:schemas-upnp-org:service:Print:1.0">
        <PrinterMakeAndModel>in arg value</PrinterMakeAndModel>
        <PrinterName>in arg value</PrinterName>
        <IPAddress></IPAddress>
    </u:SelectedPrinter>
  </s:Body>
</s:Envelope>

(DocmentData) ****************************************************************
********************************************************************************
**********
```

INFORMATION PROCESSING APPARATUS, INFORMATION PROCESSING METHOD, AND PROGRAM FOR CONTROLLING COMPUTER

BACKGROUND OF THE INVENTION

1. Field of the Invention

The present invention relates to a method of using a service providing apparatus such as a network printer as well as to the service providing apparatus.

2. Related Background Art

Recently, with the development of network infrastructure, network-enabled image processing apparatuses such as printers, scanners, and copiers or the like have been spreading rapidly. To use such a network-enabled image processing apparatus, for example, a network-enabled printer, a user must select a printer driver for controlling the network-enabled printer from among printer drivers registered in advance with an operating system which runs on a personal computer and must install it on the personal computer. Alternatively, the user must install, on the personal computer, a printer driver provided on a storage medium such as a floppy (R) disk or CD-ROM by a printer vendor, and then set network information including the IP (Internet Protocol) address assigned to the network-enabled printer, a printer board, and a printing protocol to be used.

However, in the conventional example described above, if the user moves to a network environment different from the previous one for example, if the user moves from an office network environment in building A to an office in a different building B and it becomes necessary at the new location to print a document stored on the personal computer, the user must install a printer driver for a printer on the new network and set network information anew.

In that case, the user must first know what printers are available on the network. Then, the user must get information such as vender names and model names as well as network information such as IP addresses from the administrator of the new network. This involves an enormous amount of time and labor.

Also, if an appropriate printer driver is not available, i.e., if neither a required printer driver exists on any database managed by the operating system nor the user has with him/her a storage medium containing the required printer driver, it is not possible to use the printer.

SUMMARY OF THE INVENTION

The present invention has been achieved in view of the above problems. At the time of using a service providing apparatus such as a network-enabled printer, the present invention eliminates such a need as to install special driver software for controlling the device on a computer. Also, it eliminates the need to set network information or the like to enable the driver software.

BRIEF DESCRIPTION OF THE DRAWINGS

FIG. 4 is a diagram showing a request format issued by a client at the time of searching for a server's URL;

FIG. 5 is a diagram showing a response format used when the server sends its URL to the client in return; and FIG. 6 is a diagram showing a request format issued by the client at the time of requesting the server to execute a job.

DESCRIPTION OF THE PREFERRED EMBODIMENTS

A preferred embodiment of the present invention will be described in detail below with reference to the accompanying drawings.

Figure 1:
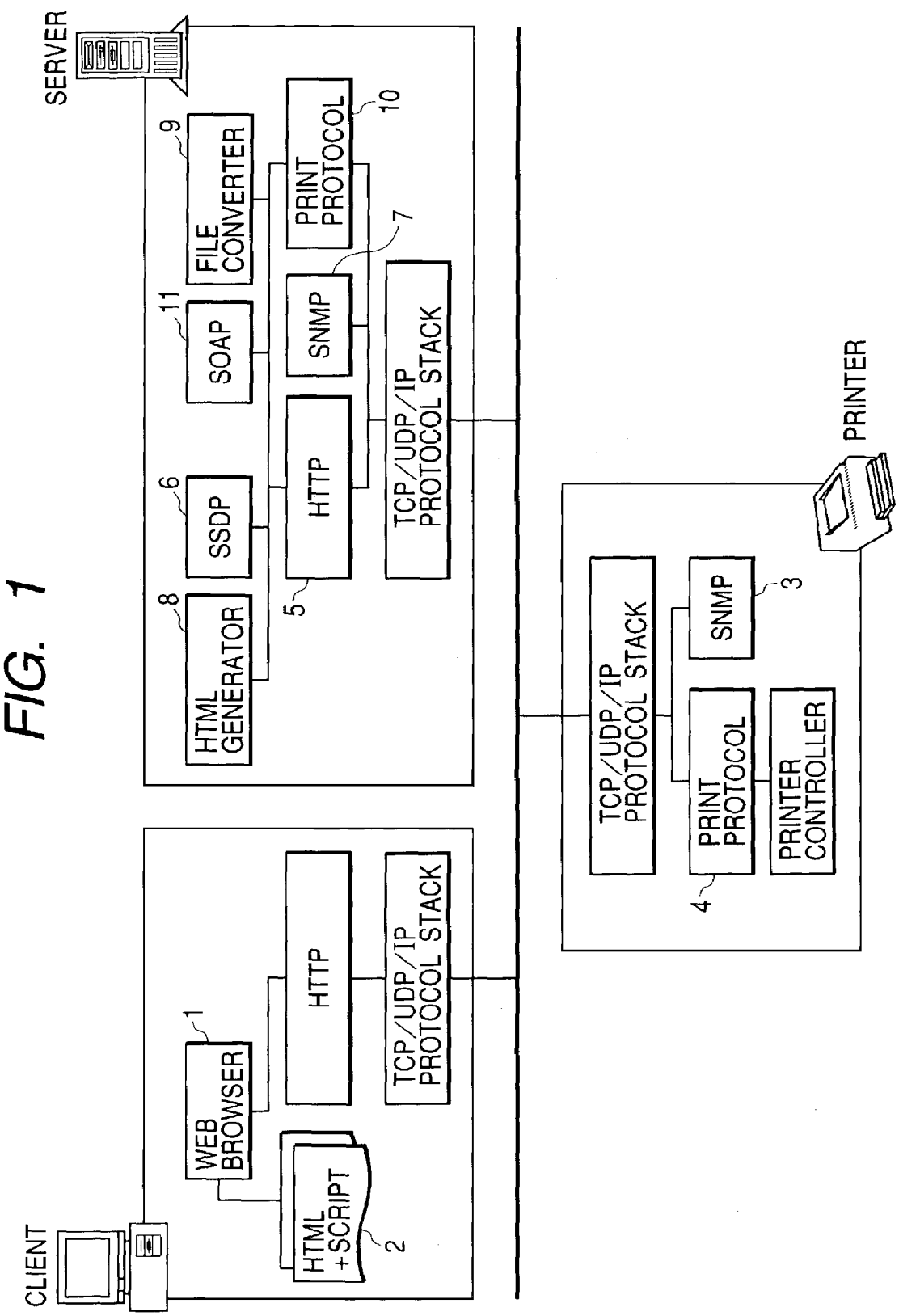
FIG. 1 is a block diagram showing a functional configuration of a network control system.

FIG. 1 is a block diagram showing a configuration of a network control system according to an embodiment of the present invention. This embodiment consists of a client computer (hereinafter referred to as a client), server computer (hereinafter referred to as a server), and network-enabled printer, each of which consists of functional modules shown in the drawing.

According to this embodiment, the client provides an environment in which a general-purpose Web browser 1 such as NetScape Navigator supplied by NetScape Communications Corp. or Internet Explorer supplied by Microsoft Corp. can run. Also, the client prestores an HTML document 2 in which search scripts have been described. The user uses the network-enabled printer via the client.

On the other hand, a network service providing apparatus the network-enabled printer according to this embodiment comprises a TCP/UDP/IP protocol stack as communications capabilities. An SNMP (Simple Network Management Protocol) control module 3 is implemented on the protocol stack. The SNMP control module 3 comprises a processor which analyzes requests issued by the server and issues responses.

Also, a print control protocol processing module 4 which supports LPR, IPP, and Port9100 is implemented on the protocol stack. The print control protocol processing module 4 comprises capabilities to analyze print requests issued by the client and send out the print requests to a printer controller.

According to this embodiment, the server is provided with a TCP/UDP/IP protocol stack as server communications capabilities. An HTTP (Hyper Text Transfer Protocol) processing module 5 is implemented on the protocol stack. The HTTP processing module 5 analyzes HTTP requests and issues responses to them. On top of the HTTP processing module 5 is an SSDP (Simple Service Discovery Protocol) processing module 6 (described later), which analyzes SSDP requests and issues responses to them.

According to this embodiment, SOAP (Simple Object Access Protocol) is used in the entity body of an HTTP request from the client and a SOAP processing module 11 is implemented at an upper level of the HTTP.

Also, the server comprises an SNMP control module 7, which searches for network-enabled printers on a network and acquires printer information. An HTML generation module 8 comprises capabilities to generate, based on data acquired as an SNMP response, HTML document data, including the printer information about the network-enabled printers currently available on the network, which can be viewed in the Web browser 1 described above.

Besides, the server is provided with a file format converter 9, which has capabilities to convert document data with a doc, xls, or ppt extension or document data in PDF format, generated by an application program, into data in a page description language (hereinafter referred to as page description language data) supported by a given printer. Incidentally, the server judges whether a page description language is supported by a printer, based on the printer information contained in the SNMP response described above.

Furthermore, the server is provided with a print control protocol processing module 10 and supports three protocols LPR, IPP, or Port9100 according to this embodiment. When page description language data is generated by the File Format converter 9, the print control protocol processing module 10 transmits it using a protocol supported by the printer specified by the client.

Figure 2:
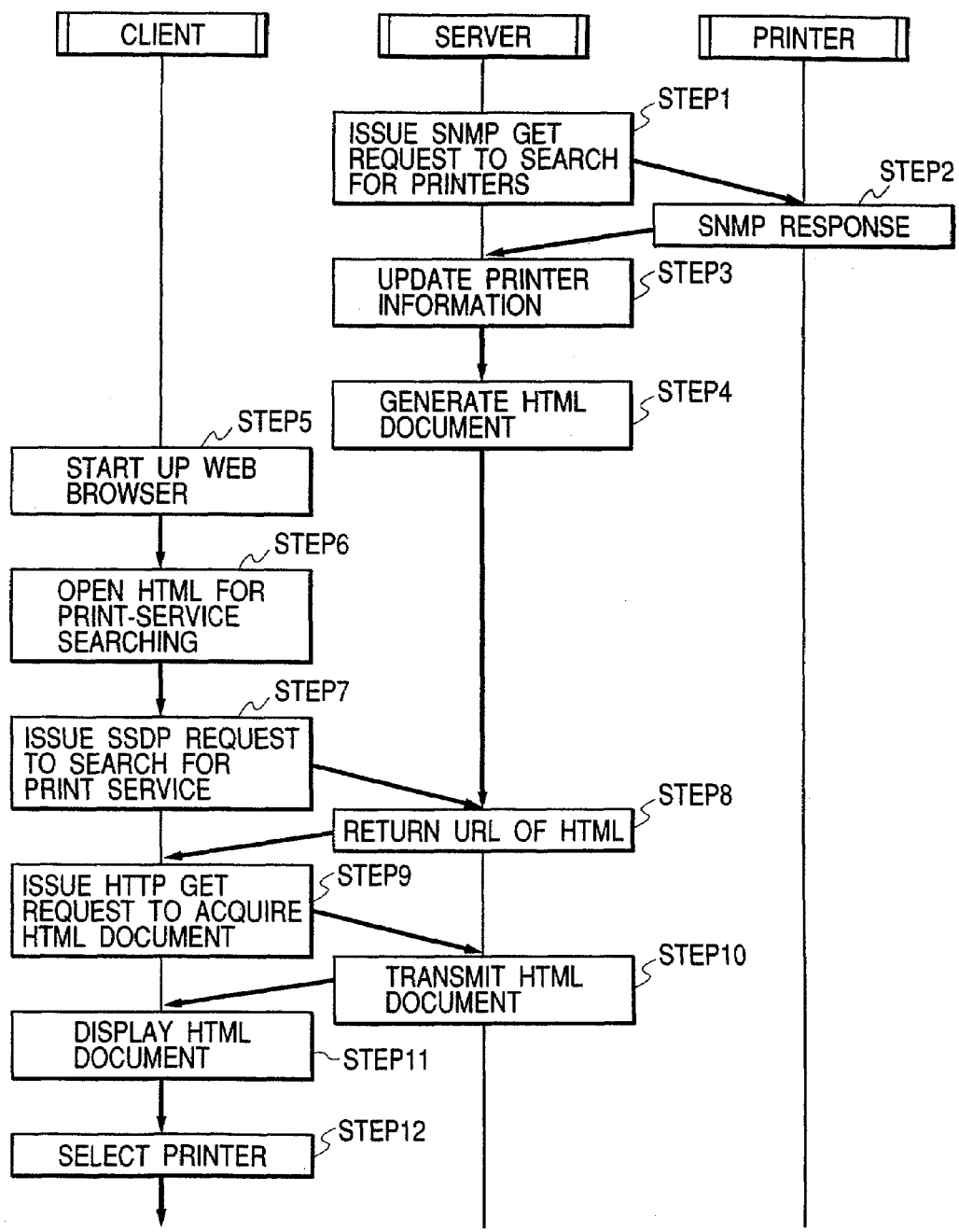
FIG. 2 is a diagram showing a flow of control actions performed by the network control system.
Figure 3:
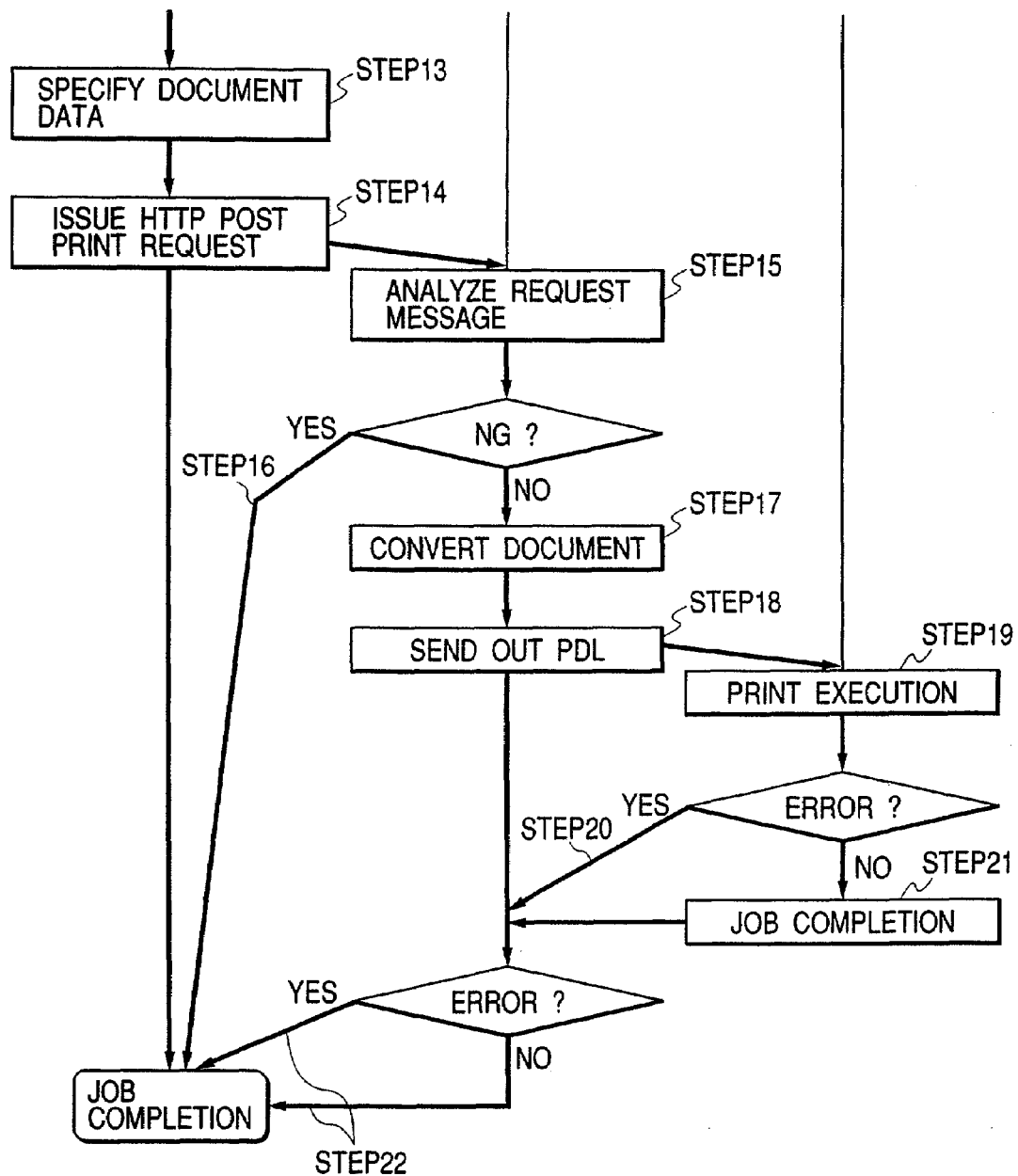
FIG. 3 is a diagram showing a flow of control actions performed by the network control system.

Next, control flow of the network control system according to this embodiment will be described with reference to a flowchart shown in FIGS. 2 and 3. After the server is started up, the SNMP control module broadcasts an SNMP Get request for the MIB objects listed below at preset intervals (step1), and thereby acquires information about printers which exist on the network.

PrinterMakeAndModel: Names of printer vendor and product

PrinterName: Printer name

PrinterLocation: Installation location of printer

IPAddress: IP address of printer

SupportedPDL: Page description language supported

SupportedPrintProtocol: Print protocol supported

In response to the request, the network-enabled printers equipped with the functional modules described above generate information which corresponds to each object and transmit an SNMP response containing the generated information to the server in a unicast manner (step2). Upon receiving the response from each network-enabled printer, the server compares the content of the response with the content of a database stored on a recording device and adds information from any newly detected printer to the database (step3). Any printer which has been registered in the database, but did not provide a response is deleted from the database (step3).

After the server updates printer information, the HTML generation module generates an HTML document which contains (1) an HTML page (containing IP addresses as hidden information) for allowing the Web browser to list the printer vendor names, product names, and printer locations of all the network-enabled printers which provided a response, (2) an HTML page equipped with a GUI (Graphical User Interface) for selecting document files to be printed, (3) a script for transmitting an HTTP POST request, with a selected document contained in the entity body, to the URL of a processor of a PDL converter, and (4) a send button for initiating transmission (step4).

The process up to this document generation is repeated at preset intervals. This makes it possible to provide the client promptly with printer information about printers which can perform printing.

When the general-purpose Web browser is started on the client (step5) and a server-search HTML document recorded in advance on the recording device on the client is opened (step6), a script described on the document is started and transmits a packet to search for the server's URL (step7). The protocol used for the search is the Simple Service Discovery Protocol stipulated by Universal Plug and Play Device Architecture 1.0, and an HTTP packet in the format shown in FIG. 4 is issued to port number 1900 at multicast address 239.255.255.250.

Upon receiving the HTTP request described above, the server according to this embodiment analyzes an ST (Service Type) header of the request. If the ST is other than Print or if packet contains something illegal, the server suspends processing and ignores the request without issuing a response.

On the other hand, if the contents of the ST header of the HTTP request specify Print, the server issues a response in the format shown in FIG. 5 to the client in a unicast manner (step8).

A Location header in the response contains the URL from which the HTML document generated by the HTML generation module 8 in the above process is acquired. Upon receiving the response, a script on the client analyzes the response packet and issues an HTTP GET request to the URL described in the header (step9). The Web browser acquires the HTML document (step10), and then displays contents of the HTML document (step11).

From a list of available printers displayed in the Web browser on the client, the user selects a desired printer based on the vender name, product name, printer name, and printer location information contained in the list (step12). Then, a page containing a GUI for specifying document data is opened, and the user specifies a document file on this page (step13).

When the user finishes specifying a document file and presses the send button on the page, the script issues an HTTP POST request to the server (step14). Also, by using the Simple Object Access Protocol (SOAP) in the entity body of the HTTP request, the script sends printer information of the printer selected by the user together with the document data. The format used is described in an Envelope tag shown in FIG. 6. As arguments to the SelectedPrinter request, PrinterMakeAndModel, PrinterName, and IPAddress are used.

Here, PrinterMakeAndModel indicates the printer vendor and product names, PrinterName indicates the printer name, and IPAddress indicates the IP address of the printer. These are all described in the HTML document received from the server.

Upon receiving the HTTP POST request, the server analyzes a SOAP message in the entity body of the HTTP request and checks the content of PrinterMakeAndModel, PrinterName, and IPAddress which are arguments to the SelectedPrinter request (step15). If any of the arguments conflict with information managed by the server itself, the server issues an HTTP error response status code "400; Bad Request" and notifies the client of the effect (step16).

If all the arguments agree with the information managed by the server, the server converts the received document data into page description language data supported by the specified printer (step17). When the conversion process is completed, the server sends out the converted page description language data to the IP address of the printer specified by the client using a protocol registered beforehand in the database and supported by the printer (step18). The printer carries out printing based on the received page description language data (step19).

If the printer uses a print protocol which allows error information to be reported, the printer notifies the server of details of any error which occurs during a printing job (step20). If the printer uses a print protocol which allows completion of printing to be reported, the printer notifies the server of completion of printing when the printing is completed successfully (step21). Upon receiving either of the notifications, the server notifies the client of the effect in an HTTP response (step22). This processing sequence completes the printing process characteristic of the present invention.

The above embodiment employs a printer as an image processing apparatus, which, however, may be a scanner, a copier, or an image processing apparatus which combines the functions of a printer and copier as long as the image processing apparatus used is capable of acquiring attribute information according to this embodiment.

Although the above embodiment uses SNMP to search for available printers, another protocol such as SLP (Service Location Protocol) may also be used as long as it allows necessary information described herein to be acquired. Also, although the above embodiment uses SOAP to describe an HTTP entity, an original schema may also be used for description.

Furthermore, although according to the above embodiment, the server generates an HTML document based on acquired printer information, an XML-based document such as an XHTML document may also be used as long as its content can be displayed and its script can be executed on a general-purpose Web browser.

As described above, the above embodiment eliminates the need to install special driver software on the client to control a network-enabled device to be used as well as the need to set up the driver software.

The object of the present invention can also be attained by a storage medium containing the software program code that implements the functions of the above embodiment: it is supplied to a system or apparatus, whose computer (or CPU or MPU) then reads the program code out of the storage medium and executes it.

In that case, the program code itself read out from the storage medium will implement the functions of the above embodiment, and the storage medium which stores the program code will constitute the present invention.

As the storage medium for supplying the program code, for example, a flexible disk, hard disk, optical disk, magneto-optical disk, CD-ROM, CD-R, magnetic tape, nonvolatile memory card, ROM, or the like may be used.

Also, the functions of the above embodiment may be implemented not only by the program code read out and executed by the computer, but also by part or all of the actual processing executed, in accordance with instructions from the program code, by an OS (operating system) running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

As can be seen from the above description, according to the present invention, when the client intends to use a network-enabled printer, the server supplies the client with printer information about available network-enabled printers, a screen for the user to select a printer, and a screen for the user to specify document data desired to be printed. Consequently, the user can use any network-enabled printer on the network without installing any driver software for controlling the network-enabled printer. This saves the trouble of installing driver software.

What is claimed is:

1. An information processing apparatus, comprising:
   an acquisition unit adapted to acquire attribute information of each of a plurality printers existing on a network;
   a generation unit adapted to generate information which displays on a Web browser a screen that allows the user to select any desired printer out of the printers of which the attribute information has been acquired by said acquisition unit, and to specify document data desired to be printed;
   a first transmission unit adapted to transmit the generated information to an external device;
   a reception unit adapted to receive the information representing the printer selected by the user through the Web browser and the document data designated by the user through the Web browser, from the external device;
   a conversion unit adapted to convert the document data received by said reception unit into data capable of being processed by the printer selected by the user, on the basis of the attribute information acquired by said acquisition unit; and
   a second transmission unit adapted to transmit the data converted by said conversion unit by using a protocol corresponding to the printer selected by the user, on the basis of the attribute information acquired by said acquisition unit.

2. An information processing apparatus according to claim 1,
   wherein the attribute information includes information of a page description language supported by the printer, and
   wherein said conversion unit converts the document data received by said reception unit into the data of the page description language supported by the printer selected by the user.

3. An information processing apparatus according to claim 1,
   wherein the attribute information includes information of a print protocol supported by the printer, and
   wherein said second transmission unit transmits the data converted by said conversion unit, by using the print protocol supported by the printer selected by the user.

4. An information processing apparatus according to claim 1, further comprising a notification unit adapted to notify the external device of an error occurred in the printer when a print process of the data transmitted by said second transmission unit is executed.

5. An information processing apparatus according to claim 1, further comprising a notification unit adapted to notify the external device that a print process of the data transmitted by said second transmission unit is completed.

6. An information processing apparatus according to claim 1, wherein said acquisition unit acquires the attribute information by using an SNMP (Simple Network Management Protocol), and said generation unit generates an HTML (Hyper Text Markup Language) document.

7. An information processing apparatus according to claim 1, wherein the protocol used by said second transmission unit is the protocol different from a protocol used by said first transmission unit.

8. An information processing method, comprising:
   an acquisition step of acquiring attribute information of each of a plurality printers existing on a network;
   a generation step of generating information which displays on a Web browser a screen that allows the user to select any desired printer out of the printers of which the attribute information was acquired in said acquisition step, and to specify document data desired to be printed;

a first transmission step of transmitting the generated information to an external device;

a reception step of receiving the information representing the printer selected by the user through the Web browser and the document data designated by the user through the Web browser, from the external device;

a conversion step of converting the document data received in said reception step into data capable of being processed by the printer selected by the user, on the basis of the attribute information acquired in said acquisition step; and a second transmission step of transmitting the data converted in said conversion step by using a protocol corresponding to the printer selected by the user, on the basis of the attribute information acquired in said acquisition step.

9. An information processing method according to claim 8, wherein the attribute information includes information of a page description language supported by the printer, and wherein said conversion step converts the document data received in said reception step into the data of the page description language supported by the printer selected by the user.

10. An information processing method according to claim 8, wherein the attribute information includes information of a print protocol supported by the printer, and wherein said second transmission step transmits the data converted in said conversion step, by using the print protocol supported by the printer selected by the user.

11. An information processing method according to claim 8, further comprising a notification step of notifying the external device of an error occurred in the printer when a print process of the data transmitted in said second transmission step is executed.

12. An information processing method according to claim 8, further comprising a notification step of notifying the external device that a print process of the data transmitted in said second transmission step is completed.

13. An information processing method according to claim 8, wherein said acquisition step acquires the attribute information by using an SNMP (Simple Network Management Protocol), and said generation step generates an HTML (Hyper Text Markup Language) document.

14. An information processing method according to claim 8, wherein the protocol used in said second transmission step is the protocol different from a protocol used in said first transmission step.

15. A computer-readable storage medium storing a computer-executable program to cause a computer to execute:

an acquisition step of acquiring attribute information of each of a plurality of printers existing on a network;

a generation step of generating information which displays on a Web browser a screen that allows the user to select any desired printer out of the printers of which the attribute information was acquired in said acquisition step, and to specify document data desired to be printed;

a first transmission step of transmitting the generated information to an external device;

a reception step of receiving the information representing the printer selected by the user through the Web browser and the document data designated by the user through the Web browser, from the external device;

a conversion step of converting the document data received in said reception step into data capable of being processed by the printer selected by the user, on the basis of the attribute information acquired in said acquisition step; and a second transmission step of transmitting the data converted in said conversion step by using a protocol corresponding to the printer selected by the user, on the basis of the attribute information acquired in said acquisition step.

* * * * *

UNITED STATES PATENT AND TRADEMARK OFFICE
CERTIFICATE OF CORRECTION

PATENT NO. : 7,148,987 B2
APPLICATION NO. : 10/300525
DATED : December 12, 2006
INVENTOR(S) : Masahiro Nishio It is certified that error appears in the above-identified patent and that said Letters Patent is hereby corrected as shown below:

COLUMN 1:
Line 24, "(R)" should be deleted.

COLUMN 4:
Line 1, "if" should read -- if the --.

COLUMN 5:
Line 66, "plurality" should read -- plurality of --.

COLUMN 6:
Line 61, "plurality" should read -- plurality of --.

Signed and Sealed this

Twenty-third Day of October, 2007

JON W. DUDAS
*Director of the United States Patent and Trademark Office*